(12) United States Patent
Matsushima

(10) Patent No.: US 9,416,254 B2
(45) Date of Patent: Aug. 16, 2016

(54) PHOTOCURABLE ACRYLIC-BASED THERMAL CONDUCTIVE COMPOSITION, ACRYLIC-BASED THERMAL CONDUCTIVE SHEET, AND METHOD OF PRODUCING THE SAME

(71) Applicant: DEXERIALS CORPORATION, Tokyo (JP)

(72) Inventor: Masayuki Matsushima, Utsunomiya (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 14/773,816

(22) PCT Filed: Apr. 24, 2014

(86) PCT No.: PCT/JP2014/061545
§ 371 (c)(1),
(2) Date: Sep. 9, 2015

(87) PCT Pub. No.: WO2014/188841
PCT Pub. Date: Nov. 27, 2014

(65) Prior Publication Data
US 2016/0024279 A1 Jan. 28, 2016

(30) Foreign Application Priority Data

May 22, 2013 (JP) ................. 2013-107731

(51) Int. Cl.
| C08K 3/22 | (2006.01) |
|---|---|
| C08J 5/18 | (2006.01) |
| C08K 9/02 | (2006.01) |
| C08F 2/44 | (2006.01) |
| C08F 2/48 | (2006.01) |
| C08K 5/00 | (2006.01) |
| C08K 5/134 | (2006.01) |
| C08K 5/13 | (2006.01) |
| C08K 5/49 | (2006.01) |
| C09K 5/14 | (2006.01) |
| C08F 220/18 | (2006.01) |
| C08F 220/20 | (2006.01) |

(52) U.S. Cl.
CPC ... *C08K 9/02* (2013.01); *C08F 2/44* (2013.01); *C08F 2/48* (2013.01); *C08K 3/22* (2013.01); *C08K 5/005* (2013.01); *C08K 5/13* (2013.01); *C08K 5/134* (2013.01); *C08K 5/49* (2013.01); *C09K 5/14* (2013.01); *C08F 220/18* (2013.01); *C08F 220/20* (2013.01); *C08F 2220/1883* (2013.01); *C08K 2003/2227* (2013.01)

(58) Field of Classification Search
CPC .................. C08K 2003/222; C08K 2003/2227
See application file for complete search history.

(56) References Cited

U.S. PATENT DOCUMENTS

| 8,148,444 B2 * | 4/2012 | Yoda ................ C08K 3/0033 522/120 |
|---|---|---|
| 2008/0081859 A1 | 4/2008 | Yoda et al. |
| 2010/0020496 A1 | 1/2010 | Yoda et al. |
| 2014/0166258 A1 * | 6/2014 | Tamura .................. C08J 5/18 165/185 |

FOREIGN PATENT DOCUMENTS

| JP | 2004-002527 A | 1/2004 |
|---|---|---|
| JP | 2004-027039 A | 1/2004 |
| JP | 2004-090516 A | 3/2004 |
| JP | 2004-315663 A | 11/2004 |
| JP | 2006-160830 A | 6/2006 |
| JP | 2012-233099 A | 11/2012 |

OTHER PUBLICATIONS

Jul. 29, 2014 International Search Report issued in International Patent Application No. PCT/JP2014/061545.

* cited by examiner

*Primary Examiner* — Vu A Nguyen
(74) *Attorney, Agent, or Firm* — Oliff PLC

(57) ABSTRACT

A photocurable acrylic-based thermal conductive composition suitable for an acrylic-based thermal conductive sheet contains 100 parts by mass of a (meth)acrylate monomer, 300 to 2,000 parts by mass of a thermal conductive filler, 0.5 to 7.0 parts by mass of a photo-radical polymerization initiator, 0.5 to 4.0 parts by mass of a primary antioxidant, 0.5 to 8.0 parts by mass of a secondary antioxidant, and 0.1 to 4.0 parts by mass of a thermal degradation inhibitor.

12 Claims, No Drawings

PHOTOCURABLE ACRYLIC-BASED THERMAL CONDUCTIVE COMPOSITION, ACRYLIC-BASED THERMAL CONDUCTIVE SHEET, AND METHOD OF PRODUCING THE SAME

TECHNICAL FIELD

The present invention relates to a photocurable acrylic-based thermal conductive composition, an acrylic-based thermal conductive sheet obtained therefrom, and a method of producing the same.

BACKGROUND ART

Thermal conductive sheets are widely used to allow electric elements such as IC chips that generate heat during driving to be in intimate contact with radiation members such as heat sinks. Examples of these thermal conductive sheets used include a thermal conductive sheet produced by: dispersing, for example, a thermal conductive filler such as fine alumina particles in a photocurable binder composition containing a photopolymerization initiator and a photocurable compound such as a photocurable silicone-based compound or a photocurable acrylic-based compound to prepare a photocurable thermal conductive composition; forming the photocurable thermal conductive composition into a sheet; and then photo-curing the photocurable thermal conductive composition (Patent Literatures 1 and 2).

CITATION LIST

Patent Literature

Patent Literature 1: Japanese Patent Application Laid-Open No. 2004-090516
Patent Literature 2: Japanese Patent Application Laid-Open No 2004-315663

SUMMARY OF INVENTION

Technical Problem

In a silicone-based thermal conductive sheet that uses a silicone-based compound as a main curable component of the photocurable binder composition, the silicone-based resin itself after photo-curing has high thermal resistance and oxygen degradation resistance. However, the material cost of the sheet is high. Furthermore, a cyclic trimer to pentamer of siloxane in a gas form that thermally decompose to form insulating silica may be released from the surface of the sheet, and there is a drawback in which the gas release may cause contact faults in electronic devices.

In an acrylic-based thermal conductive sheet that uses, as a main curable component of the photocurable binder composition, an acrylic-based compound that is more advantageous in material cost than the silicone-based compound, low-molecular siloxane gas is, of course, not released, so that the occurrence of contact faults is suppressed. However, the thermal resistance of the acrylic-based thermal conductive sheet is lower than that of the silicone-based thermal conductive sheet. The acrylic-based resin after photo-curing undergoes oxidation degradation due to peroxy radicals and hydroperoxides that are generated by active oxygen. This causes a loss of flexibility of the thermal conductive sheet, so that there arises a problem in that its thermal conductivity characteristics deteriorate.

Therefore, attempts have been made to prevent oxidation degradation of the acrylic-based thermal conductive sheet due to peroxy radicals and hydroperoxides by adding, to a photocurable acrylic-based thermal conductive composition, a so-called primary antioxidant that scavenges peroxy radicals and a so-called secondary antioxidant that decomposes hydroperoxides. However, excessive addition of these antioxidants causes a photopolymerization initiator to be deactivated during a photo-radical polymerization curing reaction of the photocurable binder composition in the photocurable acrylic-based thermal conductive composition by irradiation with ultraviolet rays. Therefore, although oxidation degradation of the acrylic-based thermal conductive sheet can be suppressed to some extent by the excessive addition of these antioxidants, thermal degradation of the acrylic-based resin due to the action of heat and oxygen when the acrylic-based thermal conductive sheet is used in a high-temperature environment cannot be suppressed sufficiently, so that there arises a problem in that the flexibility of the acrylic-based thermal conductive sheet is reduced.

An object of the present invention is to solve the above conventional problems, and it is an object of the present invention to provide a photocurable acrylic-based thermal conductive composition that contains a primary antioxidant and a secondary antioxidant and is particularly suitable for an acrylic-based thermal conductive sheet. This photocurable acrylic-based thermal conductive composition can form an acrylic-based thermal conductive sheet in which a reduction in flexibility due to heat and oxygen is prevented. It is also an object of the present invention to provide an acrylic-based thermal conductive sheet obtained from the photocurable acrylic-based thermal conductive composition and a method of producing the acrylic-based thermal conductive sheet.

Solution to Problem

The present inventor has found that the above object can be achieved by adding, to a photocurable acrylic-based thermal conductive composition, a thermal degradation inhibitor at a prescribed ratio in addition to a primary antioxidant and a secondary antioxidant. The thermal degradation inhibitor generally prevents thermal degradation of a photo-polymerized polymer by scavenging polymer radicals and is conventionally not added to a photocurable binder composition before photo-polymerization. Thus, the present invention has been completed.

Accordingly, the present invention provides a photocurable acrylic-based thermal conductive composition suitable for an acrylic-based thermal conductive sheet. The photocurable acrylic-based thermal conductive composition contains 100 parts by mass of a (meth)acrylate monomer, 300 to 2,000 parts by mass of a thermal conductive filler, 0.5 to 7.0 parts by mass of a photo-radical polymerization initiator, 0.5 to 4.0 parts by mass of a primary antioxidant, 0.5 to 8.0 parts by mass of a secondary antioxidant, and 0.1 to 4.0 parts by mass of a thermal degradation inhibitor.

The present invention also provides an acrylic-based thermal conductive sheet formed from a sheet-shaped photo-cured product of this photocurable acrylic-based thermal conductive composition.

The present invention also provides a method of producing an acrylic-based thermal conductive sheet, the method comprising: forming a photocurable acrylic-based thermal conductive composition containing a thermal conductive filler into a sheet shape; and irradiating the photocurable acrylic-based thermal conductive composition with ultraviolet rays to photo-polymerize the photocurable acrylic-based thermal conductive composition, wherein the photocurable acrylic-based thermal conductive composition used contains 100 parts by mass of a (meth)acrylate monomer, 300 to 2,000 parts by mass of the thermal conductive filler, 0.5 to 7.0 parts by mass of a photo-radical polymerization initiator, 0.5 to 4.0 parts by mass of a primary antioxidant, 0.5 to 8.0 parts by mass of a secondary antioxidant, and 0.1 to 4.0 parts by mass of a thermal degradation inhibitor.

Advantageous Effects of Invention

The photocurable acrylic-based thermal conductive composition of the present invention that is suitable for an acrylic-based thermal conductive sheet contains, at a specific ratio, a (meth)acrylate monomer, a thermal conductive filler, a photo-radical polymerization initiator, a primary antioxidant, a secondary antioxidant, and a thermal degradation inhibitor that scavenges polymer radicals. The photocurable acrylic-based thermal conductive composition already contains the thermal degradation inhibitor before the composition is subjected to photo-polymerization. Therefore, it is expected that the photo-polymerization reaction of the photocurable acrylic-based thermal conductive composition is inhibited. However, unexpectedly, the photo-polymerization reaction by irradiation with ultraviolet rays is not significantly inhibited, and the acrylic-based thermal conductive sheet after photo-polymerization contains the thermal degradation inhibitor that retains its thermal degradation prevention effect. Therefore, the photocurable acrylic-based thermal conductive composition of the present invention can provide an acrylic-based thermal conductive sheet in which oxidation degradation is prevented by the primary antioxidant and the secondary antioxidant and thermal degradation due to heat and oxygen is also prevented.

DESCRIPTION OF EMBODIMENTS

<Photocurable Acrylic-Based Thermal Conductive Composition>

The present invention is a photocurable acrylic-based thermal conductive composition suitable for an acrylic-based thermal conductive sheet. This photocurable acrylic-based thermal conductive composition contains a (meth)acrylate monomer, a thermal conductive filler, a photo-radical polymerization initiator, a primary antioxidant, a secondary antioxidant, and a thermal degradation inhibitor at a specific ratio.
((Meth)Acrylate Monomer)

The (meth)acrylate monomer used may be any known monofunctional (meth)acrylate (the term "(meth)acrylate" is intended to include acrylate and methacrylate) or any known bifunctional or higher polyfunctional (meth)acrylate. In the present invention, to impart a thermosetting property to an acrylic-based thermal conductive composition, it is preferable that at least part of the acrylic-based monomers used be a polyfunctional (meth)acrylate.

Examples of the monofunctional (meth)acrylate may include methyl (meth)acrylate, ethyl (meth)acrylate, n-propyl (meth)acrylate, i-propyl (meth)acrylate, n-butyl (meth) acrylate, i-butyl (meth)acrylate, t-butyl (meth)acrylate, 2-methylbutyl (meth)acrylate, n-pentyl (meth)acrylate, n-hexyl (meth)acrylate, n-heptyl (meth)acrylate, 2-methylhexyl (meth)acrylate, 2-ethylhexyl (meth)acrylate, 2-butylhexyl (meth)acrylate, isooctyl (meth)acrylate, isopentyl (meth) acrylate, isononyl (meth)acrylate, isodecyl (meth)acrylate, isobornyl (meth)acrylate, cyclohexyl (meth)acrylate, benzyl (meth)acrylate, phenoxy (meth)acrylate, n-nonyl (meth) acrylate, n-decyl (meth)acrylate, lauryl (meth)acrylate, hexadecyl (meth)acrylate, stearyl (meth)acrylate, and morpholines-4-yl (meth)acrylate. Examples of the bifunctional (meth)acrylate may include bisphenol F EO-modified di(meth)acrylate, bisphenol A EO-modified di(meth)acrylate, polypropylene glycol di(meth)acrylate, polyethylene glycol di(meth)acrylate, tricyclodecane dimethylol di(meth) acrylate, and dicyclopentadiene di(meth)acrylate. Examples of the trifunctional (meth)acrylate may include trimethylolpropane tri(meth)acrylate, trimethylolpropane PO-modified tri(meth)acrylate, and isocyanuric acid EO-modified tri (meth)acrylate. Examples of the tetrafunctional or higher functional (meth)acrylate may include dipentaerythritol penta(meth)acrylate, pentaerythritol hexa(meth)acrylate, pentaerythritol tetra(meth)acrylate, and ditrimethylolpropane tetraacrylate. In addition, polyfunctional urethane (meth) acrylates can be used. Specific examples may include: M1100, M1200, M1210, and M1600 (Toagosei Co., Ltd.); and AH-600 and AT-600 (Kyoeisha Chemical Co., Ltd.).

Particularly preferred examples of the (meth)acrylate monomer may include 2-ethylhexyl acrylate and lauryl acrylate because they can impart preferred flexibility to an acrylic-based thermal conductive sheet.
(Thermal Degradation Inhibitor)

The thermal degradation inhibitor prevents thermal degradation of the photocurable acrylic-based thermal conductive composition due to heat and oxygen. Generally, the thermal degradation inhibitor scavenges polymer radicals generated by the action of heat and oxygen and holds them as stable radical compounds.

In the present invention, 1,1-bis(2-hydroxy-3,5-di-tert-alkylphenyl)alkane monoacrylate represented by the formula (1) below can be used preferably as the thermal degradation inhibitor.

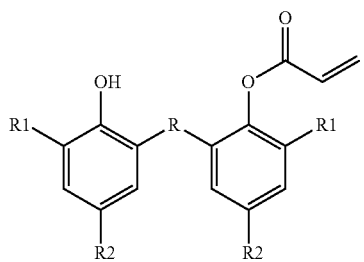

(1)

Here, R1 bonded to the 3 position of each phenyl group is a tertiary alkyl group having 4 to 6 carbon atoms, and specific examples thereof may include a tertiary butyl group, a tertiary pentyl group, and a tertiary hexyl group. Of these, a tertiary butyl group and a tertiary pentyl group are particularly preferred.

R2 bonded to the 5 position of each phenyl group is an alkyl group having 1 to 5 carbon atoms, a secondary alkyl group having 3 to 5 carbon atoms, or a tertiary alkyl group having 4 or 5 carbon atoms. Specific examples thereof may include a methyl group, an ethyl group, a propyl group, an isopropyl group, a butyl group, an isobutyl group, a secondary butyl group, a tertiary butyl group, a pentyl group, an isopentyl group, a secondary pentyl group, a tertiary pentyl group, a hexyl group, an isohexyl group, a secondary hexyl group, and a tertiary hexyl group. Of these, a methyl group, a tertiary butyl group, and a tertiary pentyl group are preferred.

R bonded to the two phenyl residues is a divalent hydrocarbon group and is preferably any of —$(CH_2)_n$— groups (n is an integer of 1 or 2) and —(CH(CH$_3$))$_n$— groups (n is an integer of 1 or 2). Of these, a —(CH(CH$_3$))— group is preferred.

Therefore, preferred specific examples of the thermal degradation inhibitor may include 1,1-bis(2-hydroxy-3,5-di-tert-alkylphenyl)alkane monoacrylate. Particularly preferred specific examples may include 1,1-bis(2-hydroxy-3,5-di-tert-pentylphenyl)ethane monoacrylate (Sumilizer GS, Sumitomo Chemical Co., Ltd.).

From the viewpoint of achieving the effect of adding the thermal degradation inhibitor appropriately and of preventing inhibition of curing, the content of the thermal degradation inhibitor in the photocurable acrylic-based thermal conductive composition is 0.1 to 4.0 parts by mass with respect to 100 parts by mass of the (meth)acrylate monomer and preferably 0.2 to 3.0 parts by mass.

From the viewpoint of achieving the effect of adding the thermal degradation inhibitor appropriately and of preventing inhibition of curing, the amount of the thermal degradation inhibitor added with respect to 100 parts by mass of the primary antioxidant described later is preferably 10 to 130 parts by mass and more preferably 20 to 100 parts by mass.

(Primary Antioxidant)

The primary antioxidant is used to scavenge peroxy radicals to thereby prevent oxidation degradation of the resin. Any known conventional primary antioxidant can be used, and a phenol-based antioxidant can be preferably used. Examples of the phenol-based antioxidant may include hexamethylene bis[(3,5-di-tert-butyl-4-hydroxyphenyl)propionic acid amide], 4,4'-thio bis(6-tert-butyl-m-cresol), 2,2'-methylene bis(4-methyl-5-tert-butylphenol), 2,2'-methylene bis(4-ethyl-6-tert-butylphenol), bis[3,3-bis(4-hydroxy-3-tert-butylphenyl)butyric acid]glycol ester, 2,2'-ethylidene bis(4,6-di-tert-butylphenol), 2,2'-ethylidene bis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3,5-di-tert-butyl-4-hydroxyphenyl) propionate]methane, 2-tert-butyl-4-methyl-6-(2-acryloyloxy-3-tert-butyl-5-methylbenzyl)phenol, 3,9-bis[1,1-dimethyl-2-{(3-tert-butyl-4-hydroxy-5-methylphenyl)propionyloxy}ethyl]-2,4,8,10-tetraoxaspiro[5.5]undecane, triethylene glycol bis[(3-tert-butyl-4-hydroxy-5-methylphenyl)propionate], and n-octadecyl-3-(4'-hydroxy-3',5'-di-tert-butylphenyl)butane. Of these, preferred examples may include n-octadecyl-3-(4'-hydroxy-3',5'-di-tert-butylphenyl)butane.

From the viewpoint of achieving the effect of adding the primary antioxidant appropriately and of preventing inhibition of curing, the content of the primary antioxidant in the photocurable acrylic-based thermal conductive composition is 0.5 to 4.0 parts by mass with respect to 100 parts by mass of the (meth)acrylate monomer and preferably 1.0 to 3.0 parts by mass.

(Secondary Antioxidant)

The secondary antioxidant is used to decompose hydroxide radicals to thereby prevent oxidation degradation of the resin. Any known conventional secondary antioxidant can be used, and a phosphorus-based antioxidant can be preferably used. Examples of the phosphorus-based antioxidant may include trisnonylphenyl phosphite, tris(2,4-di-tert-butylphenyl)phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, distearyl pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, tetra(tridecyl)isopropylidene diphenol diphosphite, tetra(tridecyl)-4,4'-n-butylidene bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylene bis(4-methyl-6-tert-butylphenyl)-2-ethylhexyl phosphite, and 4-[3-[(2,4,8,10-tetra-tert-butyldibenzo[d,f][1,3,2]dioxaphosphepin)-6-yloxy]propyl]-2-methyl-6-tert-butylphenol. Of these, 4-[3-[(2,4,8,10-tetra-tert-butyldibenzo[d,f][1,3,2]dioxaphosphepin)-6-yloxy]propyl]-2-methyl-6-tert-butylphenol is preferably used.

From the viewpoint of achieving the effect of adding the secondary antioxidant appropriately and of preventing inhibition of curing, the content of the secondary antioxidant in the photocurable acrylic-based thermal conductive composition is 0.5 to 8.0 parts by mass with respect to 100 parts by mass of the (meth)acrylate monomer and preferably 0.8 to 4.0 parts by mass.

From the viewpoint of achieving the effect of adding the secondary antioxidant appropriately and of preventing inhibition of curing, the amount of the secondary antioxidant added with respect to 100 parts by mass of the primary antioxidant is preferably 50 to 270 parts by mass and more preferably 80 to 130 parts by mass.

(Photo-Radical Polymerization Initiator)

The photo-radical polymerization initiator used may be any known conventional photo-radical polymerization initiator. Examples of an acetophenone-based photopolymerization initiator may include 2-hydroxy-2-cyclohexylacetophenone (Irgacure 184, BASF Japan Ltd.), α-hydroxy-α,α'-dimethylacetophenone (Darocure 1173, BASF Japan Ltd.), 2,2-dimethoxy-2-phenylacetophenone (Irgacure 651, BASF Japan Ltd.), 4-(2-hydroxyethoxy)phenyl(2-hydroxy-2-propyl ketone (Darocure 2959, BASF Japan Ltd.), and 2-hydroxy-1-[4-{4-(2-hydroxy-2-methyl-propionyl)-benzyl}phenyl]-2-methyl-propane-1-one (Irgacure 127, BASF Japan Ltd.). Examples of a benzyl ketal-based photopolymerization initiator may include benzophenone, fluorenone, dibenzosuberone, 4-aminobenzophenone, 4,4'-diaminobenzophenone, 4-hydroxybenzophenone, 4-chlorobenzophenone, and 4,4'-dichlorobenzophenone. Examples of a phosphorus-based photopolymerization initiator may include bis(2,4,6-trimethylbenzoyl)-phenylphosphine oxide (Irgacure 819, BASF Japan Ltd.) and 2,4,6-trimethylbenzoyl-diphenylphosphine oxide (Lucirin TPO, BASF Japan Ltd.).

Of these, 2-hydroxy-2-cyclohexylacetophenone and α-hydroxy-α,α'-dimethylacetophenone are preferred from the viewpoint of achieving smooth photo-curing, and bis(2,4,6-trimethylbenzoyl)-phenylphosphine oxide is particularly preferred.

From the viewpoint of obtaining appropriate curing properties, the content of the photo-radical polymerization initiator in the photocurable acrylic-based thermal conductive composition is 0.5 to 7.0 parts by mass with respect to 100 parts by mass of the (meth)acrylate monomer and preferably 1.0 to 3.0 parts by mass.

(Thermal Conductive Filler)

The thermal conductive filler may be any known conventional spherical, flattened, or fiber-like thermal conductive filler. Two or more types of thermal conductive fillers different in shape or size may be used in combination.

When the thermal conductive filler has a spherical or flattened shape, its size, i.e., its average particle diameter, is preferably 0.1 to 100 μm and more preferably 1 to 80 μm. When the thermal conductive filler has a fiber-like shape, its average length is preferably 1 μm to 6 mm and more preferably 5 to 900 μm.

Specific examples of the thermal conductive filler may include: insulating metal oxide fillers such as alumina, aluminum nitride, silica, zinc oxide, magnesium oxide, aluminum hydroxide, and magnesium hydroxide; semiconductor fillers such as silicon and SiC; metal fillers such as copper, silver, and aluminum; magnetic fillers such as ferrite, sendust, and amorphous metals; and fiber fillers such as glass fibers and carbon fibers. Of these, from the viewpoint of achieving good flame resistance and insulating properties, aluminum hydroxide, alumina, and magnesium oxide can be used preferably.

When the content of the thermal conductive filler in the photocurable acrylic-based thermal conductive composition is excessively low, thermal resistance cannot be reduced sufficiently. When the content is excessively high, the relative amount of the resin component becomes small, and sufficient mixing is difficult to achieve. Therefore, the content of the thermal conductive filler is preferably 300 to 2,000 parts by mass with respect to 100 parts by mass of the (meth)acrylate monomer and more preferably 650 to 1,400 parts by mass.

The photocurable acrylic-based thermal conductive composition of the present invention may contain any known plasticizer that is used for acrylic-based resins in order to impart flexibility to a thermal conductive sheet. For example, the photocurable acrylic-based thermal conductive composition may contain any of phthalate-based plasticizers, aliphatic dibasic acid ester-based plasticizers, castor oil-based fatty acid ester-based plasticizers, polyester-based plasticizers, trimellitic acid-based plasticizers, pyromellitic acid ester-based plasticizers, and phosphate-based plasticizers. In order to obtain the effect of adding the plasticizer appropriately, the content of the plasticizer in the photocurable acrylic-based thermal conductive composition is preferably 20 to 220 parts by mass with respect to 100 parts by mass of the (meth)acrylate monomer and more preferably 50 to 200 parts by mass.

If necessary, the photocurable acrylic-based thermal conductive composition may further contain a silane coupling agent, a filler such as silica or mica, a pigment, an antistatic agent, an antioxidant, an anticorrosive, a dispersant, a sedimentation inhibitor, a flame retardant, etc.

(Preparation of Photocurable Acrylic-Based Thermal Conductive Composition)

The photocurable acrylic-based thermal conductive composition can be prepared by uniformly mixing respective prescribed amounts of the (meth)acrylate monomer, the thermal conductive filler, the photo-radical polymerization initiator, the primary antioxidant, the secondary antioxidant, the thermal degradation inhibitor, and other additives added as needed using, for example, a planetary mixer (Thinky Corporation) by a routine method.

<Acrylic-Based Thermal Conductive Sheet and Production Thereof>

The photocurable acrylic-based thermal conductive composition of the present invention may be formed into a sheet-shaped cured product and used as an acrylic-based thermal conductive sheet. Specifically, the acrylic-based thermal conductive sheet can be produced by forming the photocurable acrylic-based thermal conductive composition containing the thermal conductive filler into a sheet shape and then irradiating the resultant composition with ultraviolet rays to photo-polymerize the composition. More specifically, first, the above-described photocurable acrylic-based thermal conductive composition containing the thermal conductive filler is formed into a sheet shape with a thickness of generally 500 to 2,000 μm using a routine method such as a calender method. Both sides of this sheet are irradiated simultaneously with ultraviolet rays having a maximum intensity at 300 to 400 nm from an ultraviolet lamp at an irradiation intensity of 1 mW/cm$^{2}$ $^{for}$ 5 minutes to photo-polymerize and cure the photocurable acrylic-based thermal conductive composition, whereby the acrylic-based thermal conductive sheet can be produced.

In the present invention, the degree of the "thermal conductivity" of the acrylic-based thermal conductive sheet is preferably 1 to 5 $W \cdot m^{-1} \cdot K^{-1}$ and more preferably 1 to 3 $W \cdot m^{-1} \cdot K^{-1}$.

EXAMPLES

The present invention will next be described more specifically by way of Examples.

Examples 1 and 2 and Comparative Examples 1 to 5

Components shown in TABLE 1 were uniformly mixed at a chemical composition shown in TABLE 1 using a planetary mixer (Thinky Corporation) to prepare a photocurable acrylic-based thermal conductive composition. Next, the photocurable acrylic-based thermal conductive composition was formed into a sheet with a thickness of 1,000 μm using a bar coater. Both sides of this sheet were irradiated simultaneously by an ultraviolet lamp having a maximum intensity at a wavelength of 300 to 400 nm at an irradiation intensity of 1 mW/cm$^2$ for 5 minutes to photo-polymerize and cure the photocurable acrylic-based thermal conductive composition, whereby an acrylic-based thermal conductive sheet was produced.

<Measurement of Compression Retention Rate>

The degree of loss of the flexibility of each of the obtained acrylic-based thermal conductive sheets due to heat and oxygen was evaluated by measuring a compression retention rate after aging treatment at 125° C. or 150° C. for 100 hours. In addition, the degree of coloration after the aging treatment was visually observed. The results obtained are shown in TABLE 1.

As a prerequisite to the measurement of the compression retention rate (%), compression rate (initial compression rate) before aging was measured. Specifically, each of the thermal conductive sheets produced in the Examples and the Comparative Examples was cut into a prescribed size (13.0 mm×9.5 mm×1,000 μm (thickness)), and a load of 98.135 kPa was applied. After the sheet was stabilized, its thickness (initial compression thickness [μm]) was measured, and the initial compression rate (1) was determined using the formula (1) below. The compression retention rate (%) was determined using the formula (2) below after the compression rate after aging was measured in the same manner as in the measurement of the compression rate (initial compression rate) before aging.

$$\text{Initial compression rate (\%)} = ((1{,}000 - \text{initial compression thickness})/1{,}000) \times 100 \qquad (1)$$

$$\text{Compression retention rate (\%)} = (\text{compression rate after aging}/\text{initial compression rate}) \times 100 \qquad (2)$$

It is practically desirable that the compression retention rate after aging at 120° C. and the compression retention rate after aging at 150° C. be 65% or higher. It is also desirable that no coloration be found after aging.

inhibitor was excessively high. Therefore, photo-polymerization itself did not proceed, and curing was insufficient. In

TABLE 1

|  | Example | | Comparative Example | | | | |
|---|---|---|---|---|---|---|---|
|  | 1 | 2 | 1 | 2 | 3 | 4 | 5 |
| Component Name (parts by mass) | | | | | | | |
| 2-Ethylhexyl Acrylate | 14.81 | 14.79 | 14.82 | 14.80 | 14.80 | 14.80 | 14.79 |
| Polypropylene Glycol Diacrylate (n = about 12) Aronix M-270, Toagosei Co., Ltd. | 0.280 | 0.280 | 0.280 | 0.280 | 0.280 | 0.280 | 0.280 |
| Aliphatic Plasticizer | 6.930 | 6.960 | 6.900 | 6.890 | 6.940 | 6.890 | 6.930 |
| Phenol-Based Primary Antioxidant AO-50, Adeka Corporation | 0.12 | 0.12 | 0.32 | — | — | 0.12 | 0.12 |
| Phosphorus-Based Secondary Antioxidant Sumilizer GP, Sumitomo Chemical Co., Ltd, | 0.12 | 0.12 | — | 0.32 | — | 0.12 | 0.12 |
| Thermal Degradation Inhibitor Sumilizer GS, Sumitomo Chemical Co., Ltd. | 0.09 | 0.02 | — | — | 0.32 | — | 0.82 |
| Photo-Radical Polymerization Initiator Irgacure 819, BASF Japan Ltd. | 0.12 | 0.12 | 0.12 | 0.12 | 0.12 | 0.12 | 0.12 |
| Photo-Radical Polymerization Initiator Irgacure 184, BASF Japan Ltd. | 0.12 | 0.12 | 0.12 | 0.12 | 0.12 | 0.12 | 0.12 |
| Aluminum Hydroxide Particles (Average Particle Diameter: 80 to 85 µm) | 60.4 | 60.4 | 60.4 | 60.4 | 60.4 | 60.4 | 60.4 |
| Titanate-Treated Aluminum Hydroxide Particles (Average Particle Diameter: 7.4 µm) | 61.2 | 61.2 | 61.2 | 61.2 | 61.2 | 61.2 | 61.2 |
| <Results of Measurement of Compression Retention Rate> | | | | | | | |
| initial Compression Rate (%) | 20.67 | 24.59 | 17.52 | 21.47 | 22.03 | 25.43 | 66.04 |
| Compression Rate (%) after aging at 125° C. for 100 hours | 19.02 | 16.73 | 12.89 | 17.83 | 19.12 | 16.68 | 56.3 |
| Compression Rate (%) after aging at 150° C. for 100 hours | 14.21 | 16.65 | 10.72 | 13.54 | 4.85 | 14.9 | 20.37 |
| Compression Retention Rate (%) after aging at 125° C. for 100 hours | 92.02 | 68.04 | 73.57 | 83.05 | 86.79 | 65.59 | 85.25 |
| Compression Retention Rate (%) after aging at 150° C. for 100 hours | 68.7 | 67.7 | 61.2 | 63.1 | 22.0 | 58.6 | 30.8 |
| Degree of Coloration | None | None | Slightly Browned | Slightly Browned | Browned | Slightly Browned | Browned |

As can be seen from TABLE 1, in the acrylic-based thermal conductive sheets obtained in Examples 1 and 2, the compression retention rates after aging at temperatures of 125° C. and 150° C. for 100 hours were higher than 65%. No coloration was observed after aging.

However, in the thermal conductive sheet obtained in Comparative Example 1, although the primary antioxidant was used, no secondary antioxidant and no thermal degradation inhibitor were used. Therefore, the compression retention rate after aging at 150° C. for 100 hours was lower than 65%. In addition, coloration was observed.

In the acrylic-based thermal conductive sheet obtained in Comparative Example 2, although the secondary antioxidant was used, no primary antioxidant and no thermal degradation inhibitor were used. Therefore, the compression retention rate after aging at 150° C. for 100 hours was lower than 65%. In addition, coloration was observed.

In the acrylic-based thermal conductive sheet obtained in Comparative Example 3, although the thermal degradation inhibitor was used, no primary antioxidant and no secondary antioxidant were used. Therefore, the compression retention rate after aging at 150° C. for 100 hours was significantly lower than 65%. In addition, coloration was observed.

In the acrylic-based thermal conductive sheet obtained in Comparative Example 4, although the primary antioxidant and the secondary antioxidant were used, no thermal degradation inhibitor was used. Therefore, the compression retention rate after aging at 150° C. for 100 hours was lower than 65%. In addition, coloration was observed.

In the acrylic-based thermal conductive sheet obtained in Comparative Example 5, although the primary antioxidant, the secondary antioxidant, and the thermal degradation inhibitor were used, the content of the thermal degradation inhibitor was excessively high. Therefore, the compression retention rate after aging at 150° C. for 100 hours was significantly lower than 65%. Moreover, coloration was observed.

INDUSTRIAL APPLICABILITY

The photocurable acrylic-based thermal conductive composition of the present invention that is suitable for an acrylic-based thermal conductive sheet contains, at a specific ratio, a (meth)acrylate monomer, a thermal conductive filler, a photo-radical polymerization initiator, a primary antioxidant, a secondary antioxidant, and a thermal degradation inhibitor that scavenges polymer radicals. Therefore, the photo-polymerization reaction by irradiation with ultraviolet rays is not significantly inhibited, and the acrylic-based thermal conductive sheet after photo-polymerization contains the thermal degradation inhibitor that retains its thermal degradation prevention effect. Thus, the photocurable acrylic-based thermal conductive composition of the present invention is useful for production of an acrylic-based thermal conductive sheet having resistance to oxidation degradation and resistance to thermal degradation.

The invention claimed is:

1. A photocurable acrylic-based thermal conductive composition suitable for an acrylic-based thermal conductive sheet, the photocurable acrylic-based thermal conductive composition comprising 100 parts by mass of a (meth)acrylate monomer, 300 to 2,000 parts by mass of a thermal conductive filler, 0.5 to 7.0 parts by mass of a photo-radical polymerization initiator, 0.5 to 4.0 parts by mass of a primary antioxidant, 0.5 to 8.0 parts by mass of a secondary antioxidant, and 0.1 to 4.0 parts by mass of a thermal degradation inhibitor.

2. The photocurable acrylic-based thermal conductive composition according to claim 1, wherein the thermal degradation inhibitor is 1,1-bis(2-hydroxy-3-tert-alkyl-5-alkylphenyl)alkane monoacrylate.

3. The photocurable acrylic-based thermal conductive composition according to claim 1, wherein the thermal degradation inhibitor is 1,1-bis(2-hydroxy-3,5-di-tert-alkylphenyl)alkane monoacrylate.

4. The photocurable acrylic-based thermal conductive composition according to claim 1, wherein the thermal degradation inhibitor is 1,1-bis(2-hydroxy-3,5-di-tert-pentylphenyl)ethane monoacrylate.

5. The photocurable acrylic-based thermal conductive composition according to claim 1, wherein the primary antioxidant is a phenol-based antioxidant, and the secondary antioxidant is a phosphorus-based antioxidant.

6. The photocurable acrylic-based thermal conductive composition according to claim 1, wherein the primary antioxidant is n-octadecyl-3-(4'-hydroxy-3',5'-di-tert-butylphenyl)butane, and the secondary antioxidant is 4-[3-[(2,4,8,10-tetra-tert-butyldibenzo[d,f][1,3,2]dioxaphosphepin)-6-yloxy]propyl]-2-methyl-6-tert-butylphenol.

7. The photocurable acrylic-based thermal conductive composition according to claim 1, wherein, with respect to 100 parts by mass of the primary antioxidant, an amount of the secondary antioxidant added is 50 to 270 parts by mass and an amount of the thermal degradation inhibitor added is 10 to 130 parts by mass.

8. The photocurable acrylic-based thermal conductive composition according to claim 1, wherein the (meth)acrylate monomer is 2-ethylhexyl acrylate or lauryl acrylate.

9. The photocurable acrylic-based thermal conductive composition according to claim 1, wherein the photo-radical polymerization initiator is bis(2,4,6-trimethylbenzoyl)-phenylphosphine oxide.

10. The photocurable acrylic-based thermal conductive composition according to claim 1, wherein the thermal conductive filler is aluminum hydroxide, alumina, or magnesium oxide.

11. An acrylic-based thermal conductive sheet formed from a sheet-shaped photo-cured product of the photocurable acrylic-based thermal conductive composition according to claim 1.

12. A method of producing an acrylic-based thermal conductive sheet, the method comprising: forming a photocurable acrylic-based thermal conductive composition containing a thermal conductive filler into a sheet shape; and irradiating the photocurable acrylic-based thermal conductive composition with ultraviolet rays to photo-polymerize the photocurable acrylic-based thermal conductive composition, wherein the photocurable acrylic-based thermal conductive composition used contains 100 parts by mass of a (meth) acrylate monomer, 300 to 2,000 parts by mass of the thermal conductive filler, 0.5 to 7.0 parts by mass of a photo-radical polymerization initiator, 0.5 to 4.0 parts by mass of a primary antioxidant, 0.5 to 8.0 parts by mass of a secondary antioxidant, and 0.1 to 4.0 parts by mass of a thermal degradation inhibitor.

* * * * *